US 008109681B2

(12) United States Patent
McAnulty

(10) Patent No.: US 8,109,681 B2
(45) Date of Patent: Feb. 7, 2012

(54) SUPPORT

(75) Inventor: David McAnulty, Oxfordshire (GB)

(73) Assignee: Ronford-Baker Engineering Company Ltd., Watford, Hertfordshire (GB)

( * ) Notice: Subject to any disclaimer, the term of this patent is extended or adjusted under 35 U.S.C. 154(b) by 0 days.

(21) Appl. No.: 12/795,288

(22) Filed: Jun. 7, 2010

(65) Prior Publication Data

US 2010/0310250 A1 Dec. 9, 2010

(30) Foreign Application Priority Data

Jun. 5, 2009 (GB) .................................. 0909678.5

(51) Int. Cl.
*G03B 17/00* (2006.01)

(52) U.S. Cl. ....................................................... 396/428

(58) Field of Classification Search .................. 396/419, 396/428; 248/187.1
See application file for complete search history.

(56) References Cited

U.S. PATENT DOCUMENTS

| 5,170,790 A | 12/1992 | Lacoste et al. |
| 6,991,384 B1 * | 1/2006 | Davis ............................ 396/428 |
| 2004/0206864 A1 * | 10/2004 | McAnulty ................... 248/188.8 |

FOREIGN PATENT DOCUMENTS

| FR | 2 489 475 | 3/1982 |
| GB | 1400956 | 7/1975 |
| GB | 1442381 | 7/1976 |
| WO | WO 2007/095950 A1 | 8/2007 |

OTHER PUBLICATIONS

GB Search Report dated Mar. 26, 2010 for priority application No. GB0909678.5, listing the cited references in this IDS.

* cited by examiner

*Primary Examiner* — W. B. Perkey
(74) *Attorney, Agent, or Firm* — Christie, Parker & Hale, LLP

(57) ABSTRACT

A support for a camera comprising a first fluid head and a second fluid head, the first fluid head being arranged to provide rotation about a first axis and the second fluid head being arranged to provide rotation about a second axis, which is perpendicular to the first axis.

16 Claims, 7 Drawing Sheets

SUPPORT

CROSS-REFERENCE TO RELATED APPLICATION

This application claims priority to and the benefit of British Patent Application Number 0909678.5, filed on Jun. 5, 2009.

This invention relates to a support. In particular, but not exclusively, it relates to a tilt-pan camera support, which allows for rotation of a supported camera, or other equipment, about at least two axes.

There is often a requirement for camera equipment to be supported, during filming, so that it can be tilted about a horizontal axis and panned about a vertical axis. Prior art arrangements, allowing such movement, have been inflexible, making it difficult to adapt them to different filming environments and/or requirements. Moreover, the prior art arrangements have not permitted rotation about a third or further axis.

The present invention arose in a bid to provide an improved support.

According to the present invention, there is provided a support for a camera comprising a first fluid head and a second fluid head, the first fluid head being arranged to provide rotation about a first axis and the second fluid head being arranged to provide rotation about a second axis, which is perpendicular to the first axis.

Preferably, the support further comprises a third fluid head, the third fluid head being arranged to provide rotation about a third axis, which is perpendicular to the second axis, and which varies in orientation with respect to the first axis with rotation about the second axis.

Preferably, the support is arranged such that a supported camera can be rotated about all of the axes simultaneously.

The camera may be supported such that its position can be adjusted linearly in a first direction, which is perpendicular to the second axis, and/or in a second direction, which is perpendicular to the third axis. The distance between the first and second fluid heads may be adjustable in the first and second axial directions. The distance between the second and third fluid heads may be adjustable in the second and third axial directions.

Most preferably, all of the fluid heads are substantially identical to one another. This allows for economy and the use of the same type of component for providing rotation about two or three different axes. It enables more efficient stocking and maintenance.

All of the fluid heads are preferably provided with a connecting means, arranged to allow detachable connection of each of the fluid heads from the support.

Preferably, the first and second fluid heads are detachably connected to one another, using the connecting means, via one or more intermediate components, provided with compatible connecting means.

The first and second fluid heads may be connected via a substantially J-shaped (otherwise known as L-shaped) component, which is provided with compatible connecting means at each of its longitudinal ends. The connecting means may be arranged such that either end of the substantially J-shaped component can be connected to either one of the first or second fluid heads. Either one or both of the first and second fluid heads may be connected to the substantially J-shaped component via one or more spacers, provided with compatible connecting means.

The camera is preferably supported by a platform provided with a connecting means identical to the connecting means of the fluid heads, wherein the platform is preferably detachably connected to the second fluid head, using the connecting means, via at least one intermediate component, which is provided with a compatible connecting means.

The camera is alternatively supported by the third fluid head, wherein the third fluid head is preferably detachably connected to the second fluid head, using the connecting means, via at least one intermediate component, which is provided with a compatible connecting means.

The intermediate component is preferably slidably supported by the second fluid head with a ratchet mechanism provided to allow the position of the intermediate component relative the second fluid head to be locked.

The camera may be slidably supported by the platform or the third fluid head, and a ratchet mechanism is provided to allow the position of the camera relative to the platform or the third fluid head to be locked.

The connecting means provided on each of the fluid heads may comprises one of a dovetail mortice or a dovetail tenon and the corresponding compatible connecting means may comprise the other one of a dovetail mortice or a dovetail tenon, so as to provide a sliding dovetail mortice and tenon joint.

Preferably, the mortice and tenon each have a continuous profile, comprising tapered front and rear sections and a central section of continuous width, which extends between the front and rear sections, wherein the front section is tapered to expand from a minimum width at the front end of the mortice/tenon to the width of the central portion, and wherein the rear section is tapered to expand from the width of the central portion to a maximum width at the rear of the mortice/tenon.

Embodiments of the invention will now be described, by way of example only, with reference to the accompanying drawings, in which.

Figure 1:
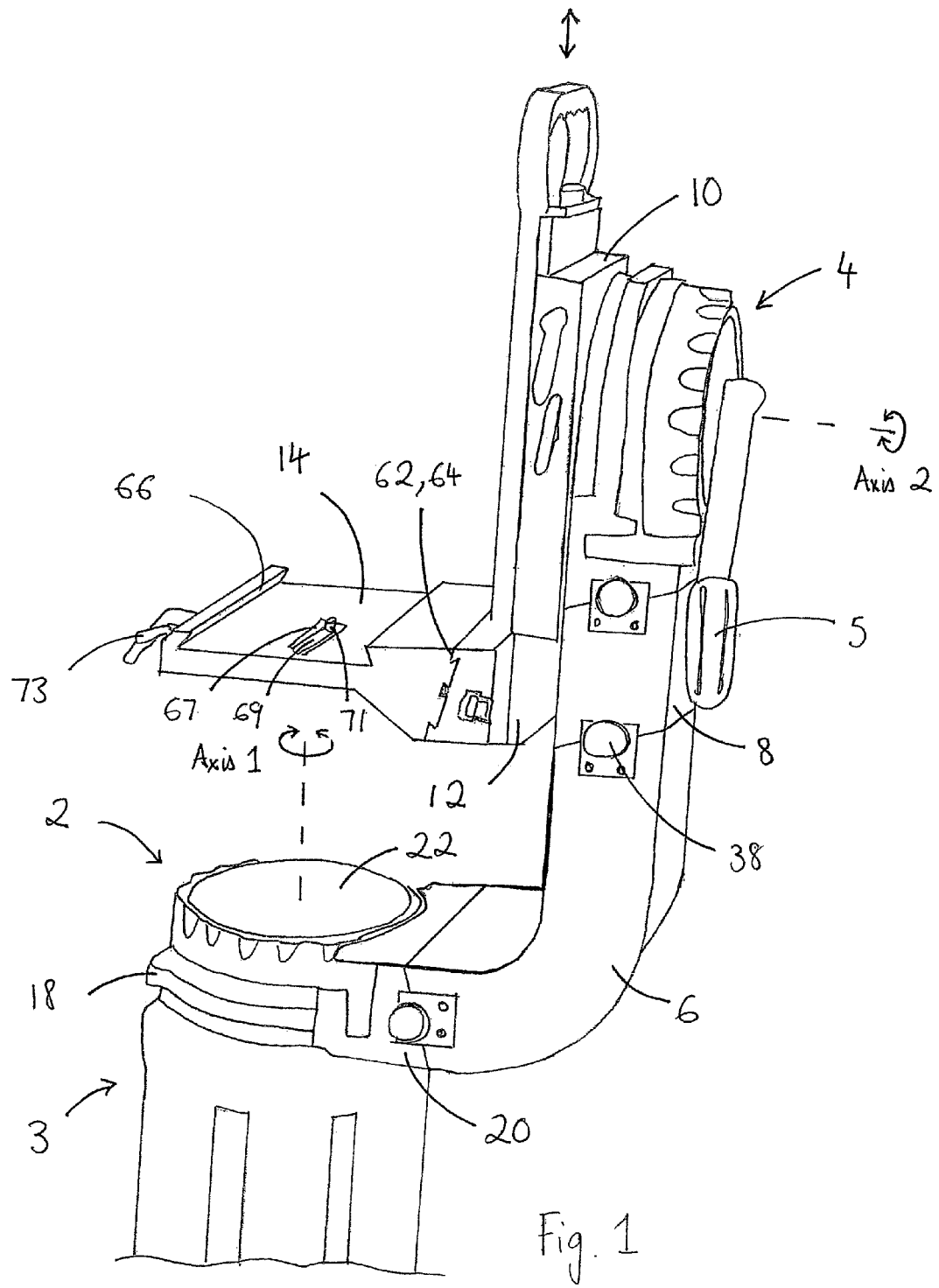
FIG. 1 shows a perspective view of a support in accordance with the present invention in a first configuration.
Figure 2:
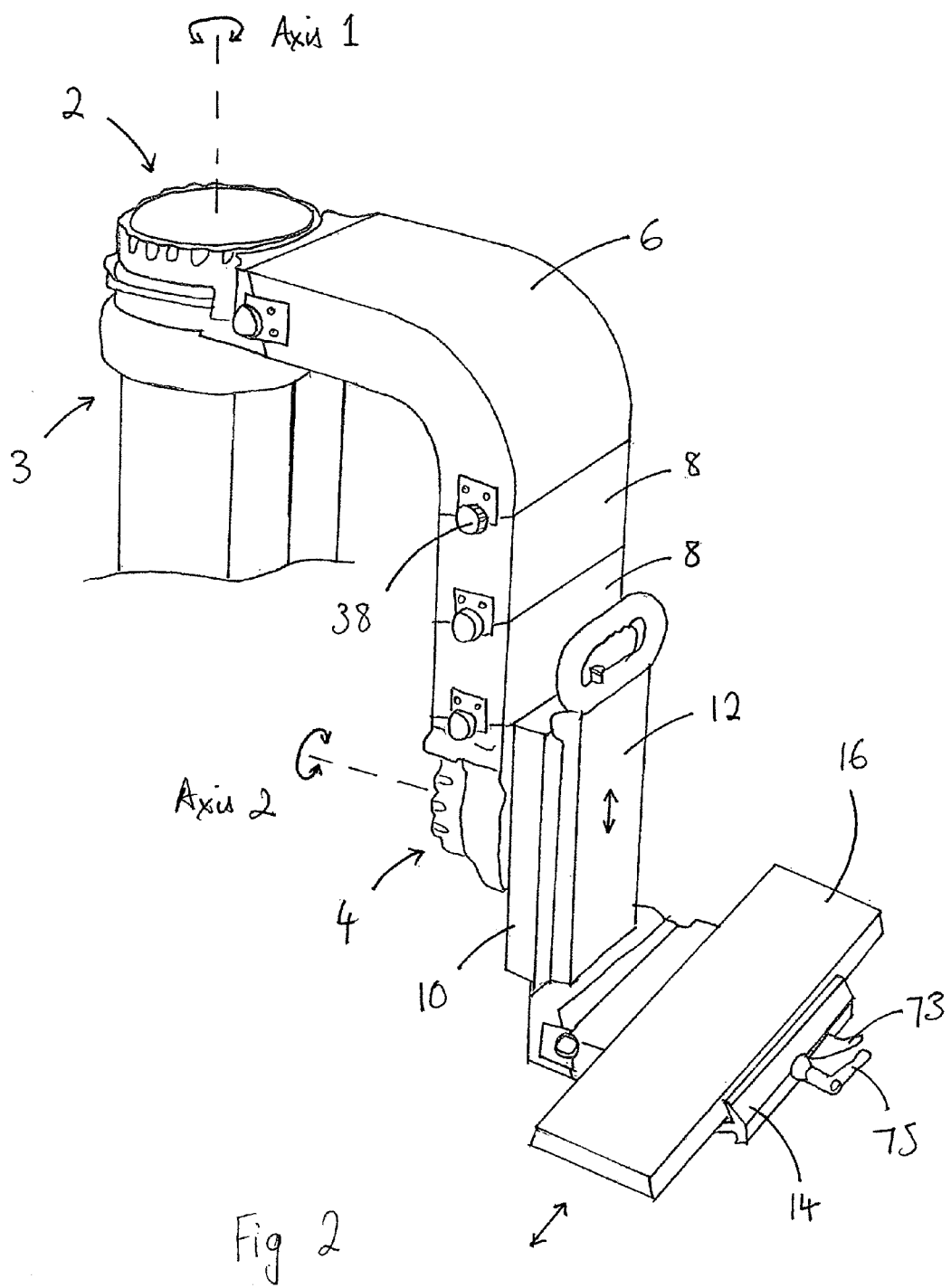
FIG. 2 shows a perspective view of a support in accordance with the present invention in a second configuration.

With reference to FIGS. 1 and 2, there is shown a support in accordance with the present invention. It should be noted that since the support is of modular construction, as will become clear from the following description, it may be configured in a number of different configurations. FIGS. 1 and 2 show two such configurations. The present invention is not limited to these configurations.

Referring to FIG. 1, the support comprises a first fluid head 2, which is attached to a stand 3, or similar support, and which allows for rotation about a first (pan) axis; a second fluid head 4, which allows for rotation about a second (tilt) axis; a J-block (L-shaped connector) 6 and a spacer block 8, which connect to one another and together connect the first and second fluid heads; a guide plate 10, which is attached to the second fluid head and which supports a tilt adjusting plate 12; and a platform 14, which is attached to the tilt adjusting plate and is arranged to support a camera, mounted to a camera plate (16—see FIG. 2), in use.

Other shapes or configurations of L-shaped connectors or J-blocks may be used, than the ones specifically shown.

The internal construction of fluid heads, which permit fluid damped rotary movement, is well known to persons skilled in the art and will not therefore be detailed herein. A fluid head uses a fluid between joints (e.g. rotary joints) to provide for very smooth movements. The internal construction of the first and second fluid heads is in accordance with known fluid heads.

Each fluid head comprises a substantially annular body 18, which may be formed from a single piece of material, preferably aluminium, and is provided on a side surface with a connecting means 20. A fluid module 22 is provided within the housing, wherein the body and fluid module are arranged to rotate relative to one another. The first and second fluid heads are identical.

The first fluid head is connected to the stand. The fluid module is fixed in relation to the stand and the body of the fluid head rotates relative to the fluid module. By virtue of this arrangement, the components of the support which are supported by/connected to the body of the first fluid head may rotate about the first (pan) axis.

Figure 3:
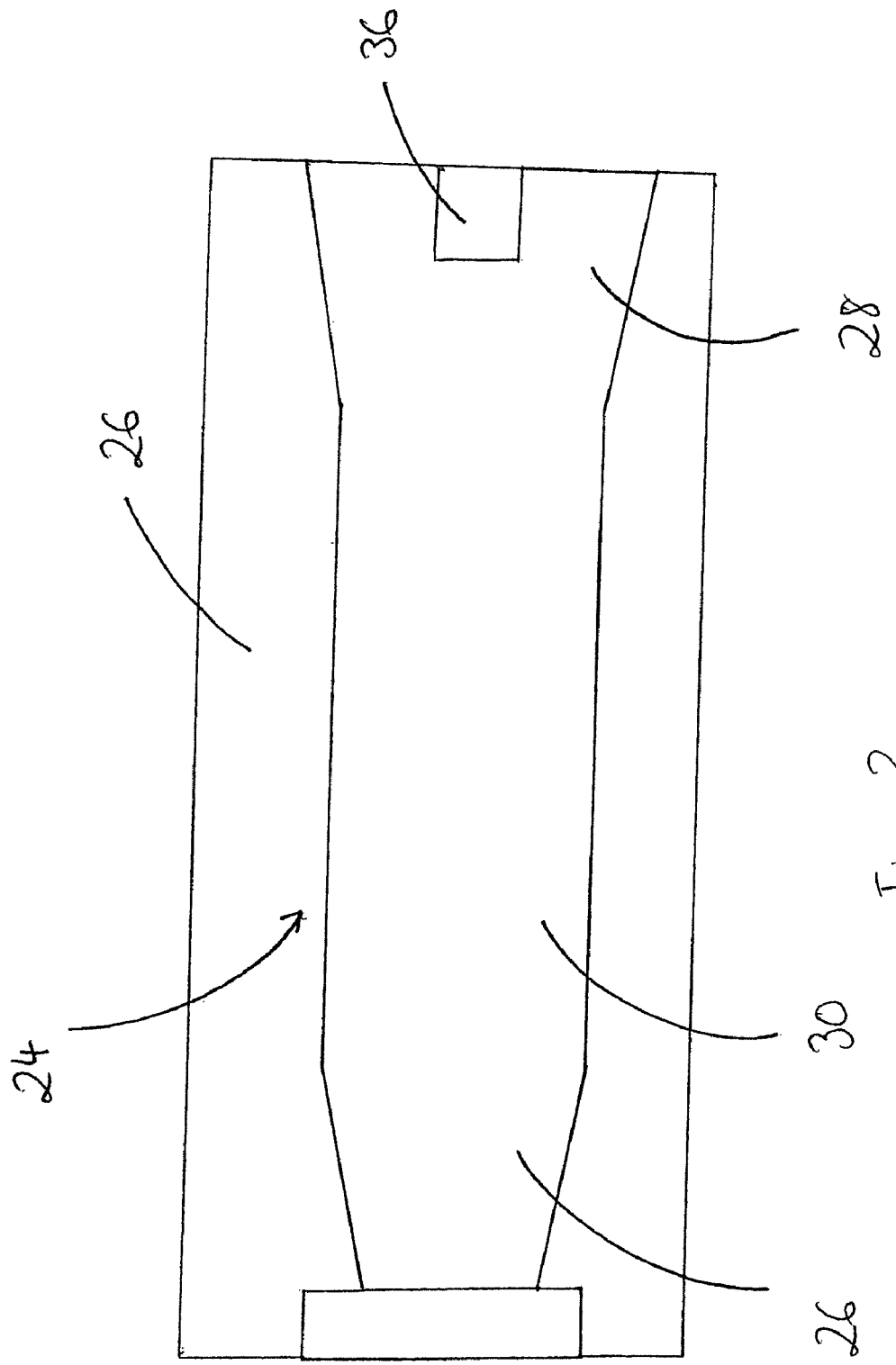
FIG. 3 shows a front view of a tenon in accordance with the present invention.
Figure 4:
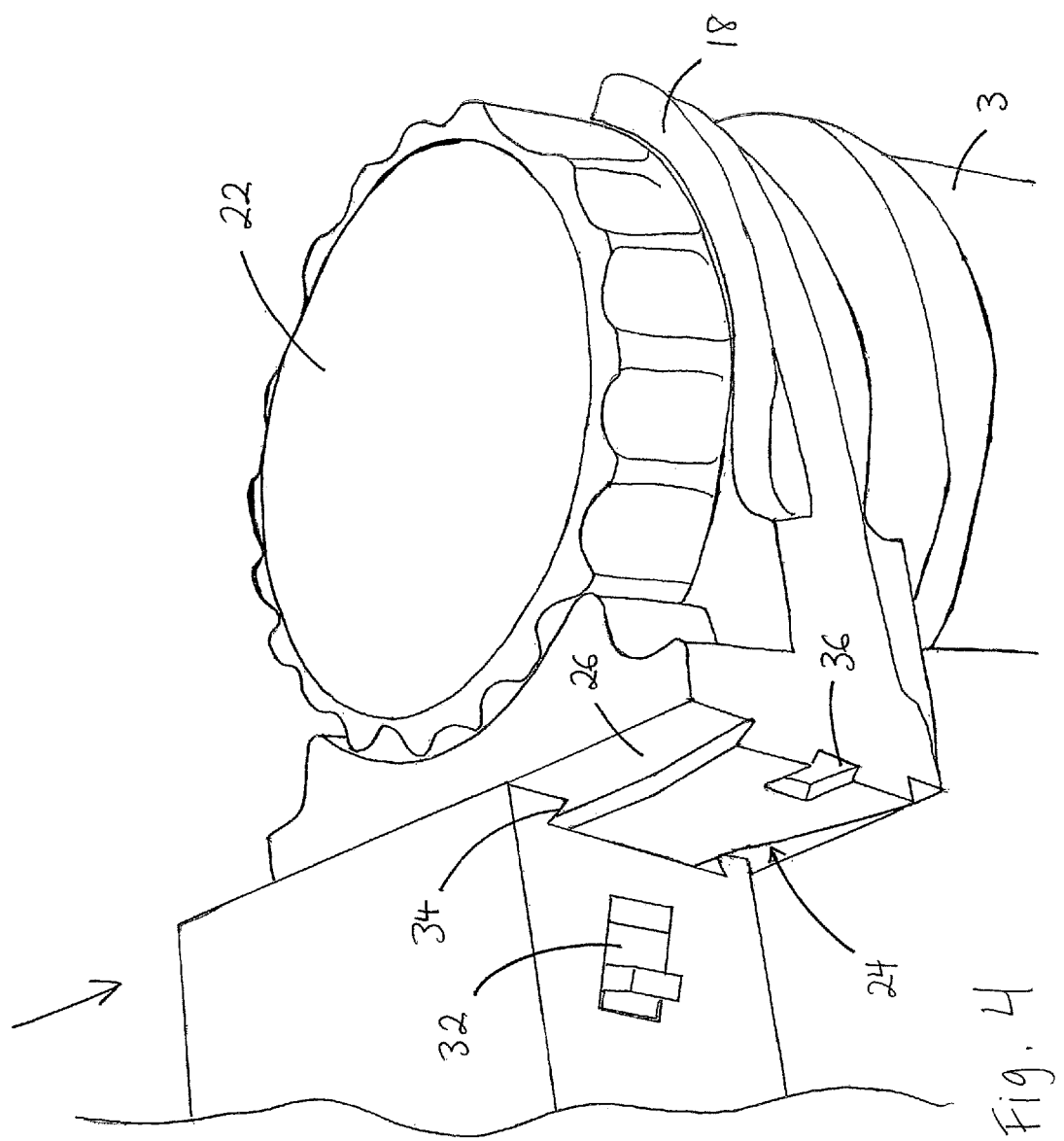
FIG. 4 shows a perspective view of a sliding dovetail mortice and tenon joint between a fluid head and a compatible component in accordance with the present invention.

The connecting means of each fluid head, as shown most clearly in FIGS. 3 and 4, comprises a dovetail tenon 24 provided on a substantially planar face 26. The planar face is provided at an angle of between 15 and 45 degrees to the axis of rotation of the fluid head. The dovetail tenon is provided to form a sliding dovetail mortice and tenon joint with a corresponding dovetail mortice 34 provided on any one of a number of compatible components. Both the J-block and the spacer block(s) are formed with corresponding mortices 34 in substantially planar faces thereof, as discussed below.

As shown in FIG. 3, the width of each tenon 24 increases between a front end and a rear end of the tenon. The tenon has a continuous profile, comprising tapered front and rear sections 26, 28 and a central section 30 of continuous width, which extends between the front and rear sections. The front section is tapered to expand from a minimum width at the front end of the tenon to the width of the central portion. The rear section is tapered to expand from the width of the central portion to a maximum width at the rear of the tenon. By virtue of this profile, when a connection is to be made between one of the fluid heads and a compatible component, such as the J-block or the spacer block, the relatively wide rear portion of the mortice on the component is easily guided over the narrow front portion of the tenon on the fluid head, allowing for a certain sliding attachment of the two; the component being slid in a rearwards direction. Furthermore, since the width of both the mortice and tenon increases, once the mortice and tenon are fully engaged, there is provided a solid connection, and further sliding in the rearwards direction is prevented by engagement of the mating tapers of the mortice and the tenon. The planar face of the fluid head abuts the planar face of the component when the two are connected.

Alternative mortice and tenon profiles as well as alternative connecting means are possible, as will be readily appreciated by the skilled person.

In order to restrict transverse movement in the other, forward direction, each compatible component is provided with a spring-loaded catch 32, located adjacent its mortice(s) 34, which is arranged to engage a notch 36, shown most clearly in FIG. 3, which is provided at the rear of the tenon 24 on the fluid head.

In order to fully secure the component to the fluid head, each component is further provided with a screw 38, which is located adjacent the mortice(s) at the opposite end of the mortice to the spring loaded catch, and is arranged to be screwed into a threaded hole provided in the fluid head body. The hole in the fluid head body extends in a transverse direction, parallel to the tenon. The screw is provided with a head arranged to allow tightening and loosening of the screw by hand, most preferably in the form of a large knurled head as shown.

Alternative locking means are possible, as will be readily appreciated by the skilled person.

The J-block, which, in the arrangements of FIGS. 1 and 2, is the component directly connected to the first fluid head, is a substantially J-shaped component, which, by virtue of its shape, permits support of the second fluid head relative to the first fluid head such that the axes of the first and second fluid heads are perpendicular to one another. The J-block is provided with a mortice at each of its longitudinal ends, which lie perpendicular to one another. The J-block allows for either a direct connection between the first and second fluid heads or, as shown in FIGS. 1 and 2, a connection through one or more spacer blocks. As in the case of the fluid head bodies, the body of the J-block may be formed from a single piece of material, preferably aluminium. The J-block is provided with a spring-loaded catch and screw, as described above, adjacent both of its mortices.

The spacer blocks, in contrast to the J-block, are provided with a mortice at one end and a tenon at the other end, which are provided parallel to one another. By virtue of this construction, the spacer blocks may be connected to one another, end to end, and may provide an interconnection between the first or second fluid head and the J-block. Such an interconnection may be varied in size by using multiple spacer blocks. By varying the size of this interconnection the distance between the first and second fluid heads may be adjusted in the first and/or second axial directions. The spacer blocks are shorter than the J-block. The spacer blocks are provided with a spring-loaded catch and screw, as described above, adjacent their mortices.

It should be noted that whilst in the described arrangements, the fluid heads are provided with tenons, they may alternatively be provided with mortices, with the mortices and tenons provided on the compatible components (J-block and spacers) swapped accordingly to maintain compatibility.

The second fluid head is connected to the guide plate 10. The fluid module of the second fluid head is fixed to the guide plate, wherein rotation of the fluid module relative to the body of the second fluid head causes rotation of the guide plate relative to the body of the second fluid head. The body of the second fluid head is fixed by the connection with the J-block and spacer block to lie in a plane parallel to the first (pan) axis. With the orientation of the body of the second fluid head fixed relative to the first axis, the second axis is fixed to be perpendicular to the first axis.

The second fluid head is further provided with a handle 5, which allows a user to rotate the fluid module of the second fluid head directly, which effects rotation of the tilt adjusting plate, the platform and the camera plate about the first axis. The handle also allows the user to rotate the support about the first axis, by indirect rotation of the body of the first fluid head about the fluid module of the first fluid head.

The guide plate 10 is substantially planar and lies in a plane that is parallel to the first axis. The guide plate is provided with a longitudinally extending dovetail mortice 40, which is arranged to receive a corresponding dovetail tenon 41 provided on the tilt adjusting plate. The mortice and corresponding tenon are both of continuous width to allow the tilt adjusting plate to slide back and forth relative to the guide plate. With this sliding connection, the position of the platform and the supported camera plate may be adjusted linearly in a direction perpendicular to the second axis.

In order to lock the position of the tilt adjusting plate relative to the guide plate there is a ratchet mechanism provided.

Figure 5:
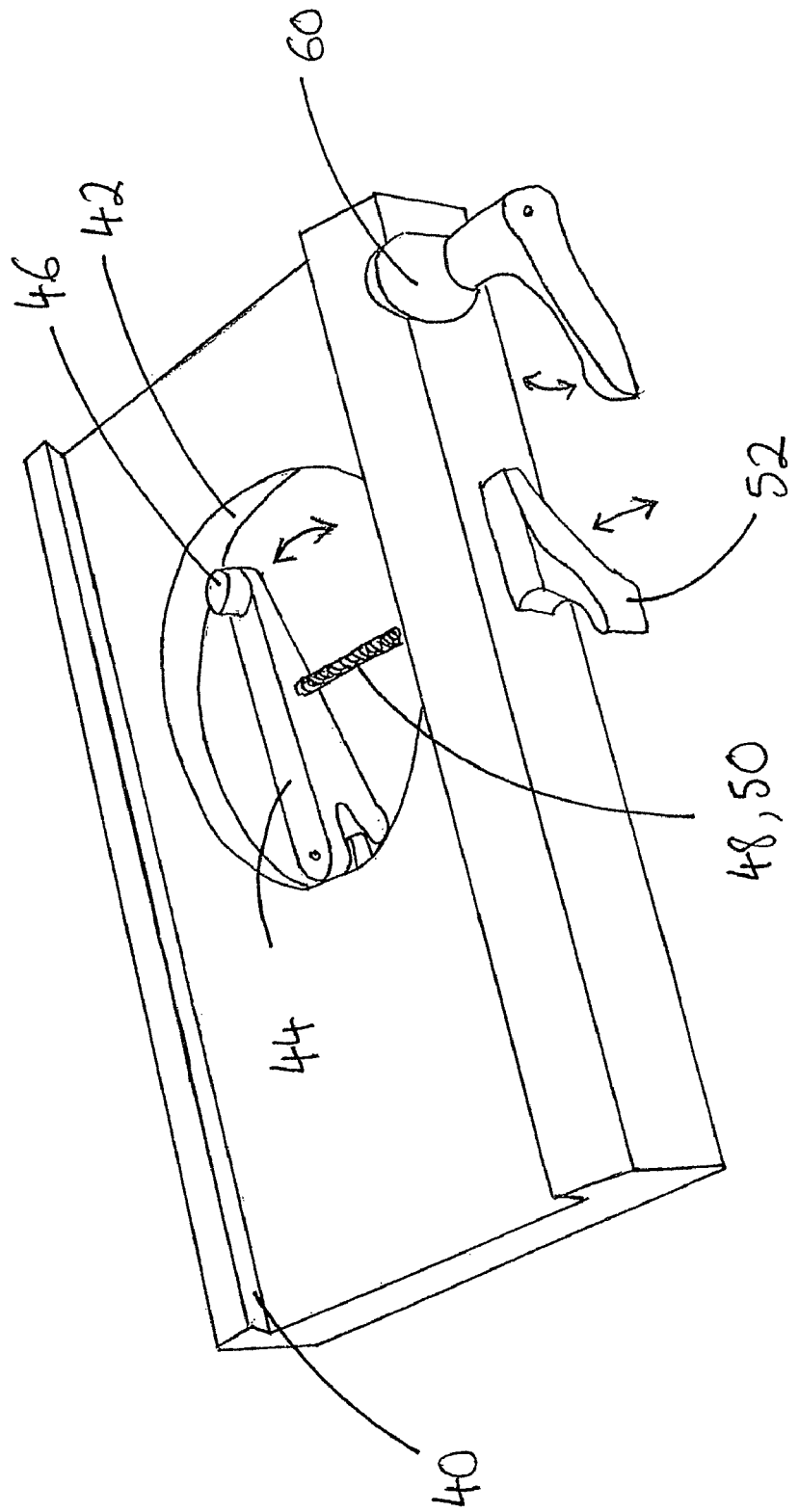
FIG. 5 shows a perspective view of a guide plate of the present invention.

As shown in FIG. 5, the guide plate is provided, in its face adjacent the mortice 40, with an opening 42. Within the opening there is provided a pivoting arm 44, which pivots in a plane parallel to the face. The pivoting arm is provided at its end with an upstanding annular boss 46, which protrudes from the opening, in a direction perpendicular to the face, to a level above the face. The arm is connected to a rod 48, provided with a spring 50. The rod is connected to a handle 52 provided on a side of the guide plate. The spring acts to bias the pivoting arm and the handle allows the arm to be pivoted against the biasing force.

Figure 6:
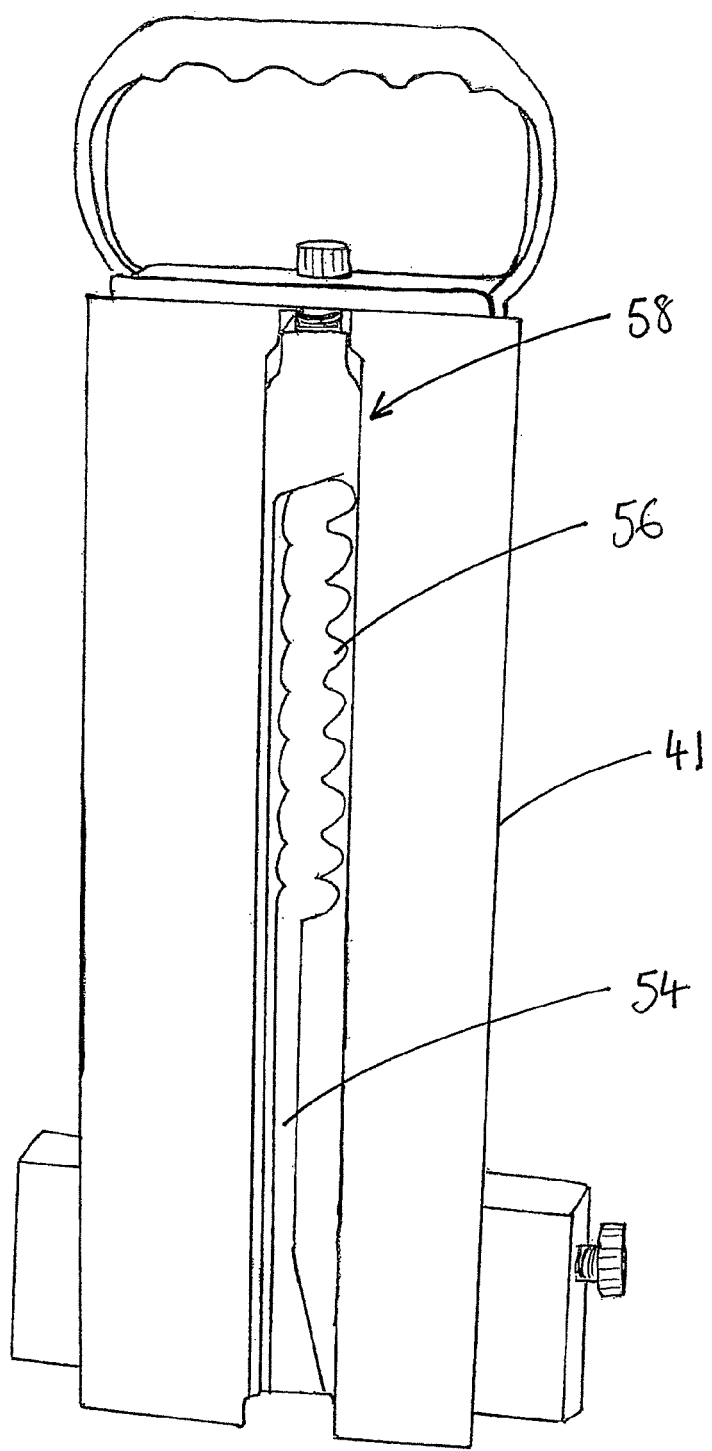
FIG. 6 shows a rear view of a tilt adjusting plate in accordance with the present invention.

As shown in FIG. 6, the tilt adjusting plate 12 is provided, in its face adjacent the tenon, with a groove 54, which is open at its lower end and closed at its upper end, in the longitudinal direction of the tilt adjusting plate. The groove is provided with a wide opening which tapers to a relatively narrow portion, which has substantially the same width as the boss, before opening out into a series of detents 56. In the arrangement of FIG. 5, the groove is provided in a separate, preferably steel insert 58, which enables the tilt adjusting plate to be manufactured from a lighter, less durable, material, preferably aluminium. In alternative arrangements the tilt adjusting plate may be machined from a single piece of material, thus eliminating the insert.

The groove is arranged such that when the tilt adjusting plate is brought into sliding contact with the guide plate, the boss enters the groove and is urged by the tapered sidewall of the groove, against the force of the spring, into the narrow portion of the groove. Once the tilt adjusting plate has been slid sufficiently far that the boss reaches the first detent, the force acting against the spring bias is removed, at which point the resilient force of the spring urges the boss into the first detent, thus locking the tilt adjusting plate relative to the guide plate. If it is desired to slide the tilt adjusting plate further, a user may simply use the handle to overcome the biasing force of the spring, which removes the boss from the detent and enables the tilt adjusting plate to be slid to a further detent.

In order to more securely lock the tilt adjusting plate to the guide plate, once the boss is located in a desired detent, the guide plate is provided with a screw 60, which extends through the dovetail mortice of the guide plate. When the guide plate and tilt adjusting plate are connected the screw can be brought into contact with the tenon of the tilt adjusting plate to securely clamp it in place. The screw is provided with a handle that is arranged to allow it to be turned by hand, as is clearly shown in FIG. 4.

Other connection means, which allow for a lockable sliding connection are possible, as will be readily appreciated by the skilled person.

The tilt adjusting plate is provided, on its face opposed to the groove, with attachment means for attaching the tilt adjusting plate to the platform. The attachment means comprises a mortice 62, which is identical to the mortices 34 provided on the components to be attached to the fluid heads, such as the J-block and the spacer block, described above. A spring-loaded catch is again provided adjacent to the mortice, which is arranged to engage a notch provided at the rear of the tenon on the platform. In order to fully secure the platform to the tilt adjusting plate, the tilt adjusting plate is further provided with a screw, as discussed above with reference to the J-block and spacers.

The platform is substantially planar and is provided on one of its longitudinal side edges with a tenon 64, which is identical to the tenons 24 provided on the fluid heads, described above.

The orientation of the sliding dovetail mortice and tenon joint between the tilt adjusting plate and the platform is such that the tilt adjusting plate and platform, when connected, lie perpendicular to one another.

The platform 14 is substantially planar and is provided with a longitudinally extending dovetail mortice 66, which is arranged to receive a corresponding dovetail tenon provided on the camera plate 16. The mortice and corresponding dovetail are both of continuous width to allow the camera plate to slide back and forth relative to the platform.

In order to lock the position of the camera plate relative to the platform there is a ratchet mechanism provided, which may be substantially identical to the ratchet mechanism between the guide plate and the tilt adjusting plate, described above.

The platform is provided, in its face adjacent the mortice, with an opening 67. Within the opening there is provided a pivoting arm 69, which pivots in a plane parallel to the face. The pivoting arm is provided at its end with an upstanding annular boss 71, which protrudes from the opening, in a direction perpendicular to the face, to a level above the face. The arm is connected to a rod, provided with a spring. The rod is connected to a handle 73 provided on a side of the guide plate. The spring acts to bias the pivoting arm.

The camera plate is provided, in its face adjacent the tenon, with a groove, arranged to receive the boss, which is provided with a series of detents.

The groove is arranged such that when the camera plate is brought into sliding contact with the platform, the boss enters the groove. Once the camera plate has been slid sufficiently far that the boss reaches the first detent, the resilient force of the spring urges the boss into first detent, thus locking the camera plate relative to the platform. If it is desired to slide the tilt adjusting plate further, a user may simply use the handle to overcome the biasing force of the spring, which removes the boss from the detent and enables the camera plate to be slid to a further detent.

In order to more securely lock the camera plate to the platform, the guide plate is provided with a screw, which extends through the dovetail mortice of the platform. When the camera plate and platform are connected the screw can be brought into contact with the tenon of the camera plate to securely clamp it in place. The screw is provided with a handle 75 that is arranged to allow it to be turned by hand, as is clearly shown in FIG. 2.

Other connection means, which allow for a lockable sliding connection are possible, as will be readily appreciated by the skilled person.

FIG. 2 shows an alternative arrangement to that of FIG. 1. In this arrangement, the J-block has been turned around with the end previously connected to the first fluid head now connected to the second fluid head, and the end previously connected to the second fluid head now connected to the first fluid head. By turning the J-block around, the support is effectively inverted. Additionally, a further spacer has been inserted between the second fluid head and the J-block.

Since the fluid heads, J-block, spacer blocks, tilt adjusting plate and platform are all provided with compatible dovetail mortice(s) and/or tenon(s), as discussed, the support is extremely flexible. For example, it is possible to introduce one or more spacer blocks between any of the mortice and tenon joints, described above, to alter the dimensions of the support. Considering, as an example, the mortice and tenon joint between the tilt adjusting plate and the platform, as shown in FIGS. 1 and 2, one or more spacer blocks may be introduced to space the camera plate from the second fluid head in the second axial direction of the second fluid head. On the other hand, any of the disclosed spacer blocks may also be omitted.

Figure 7:
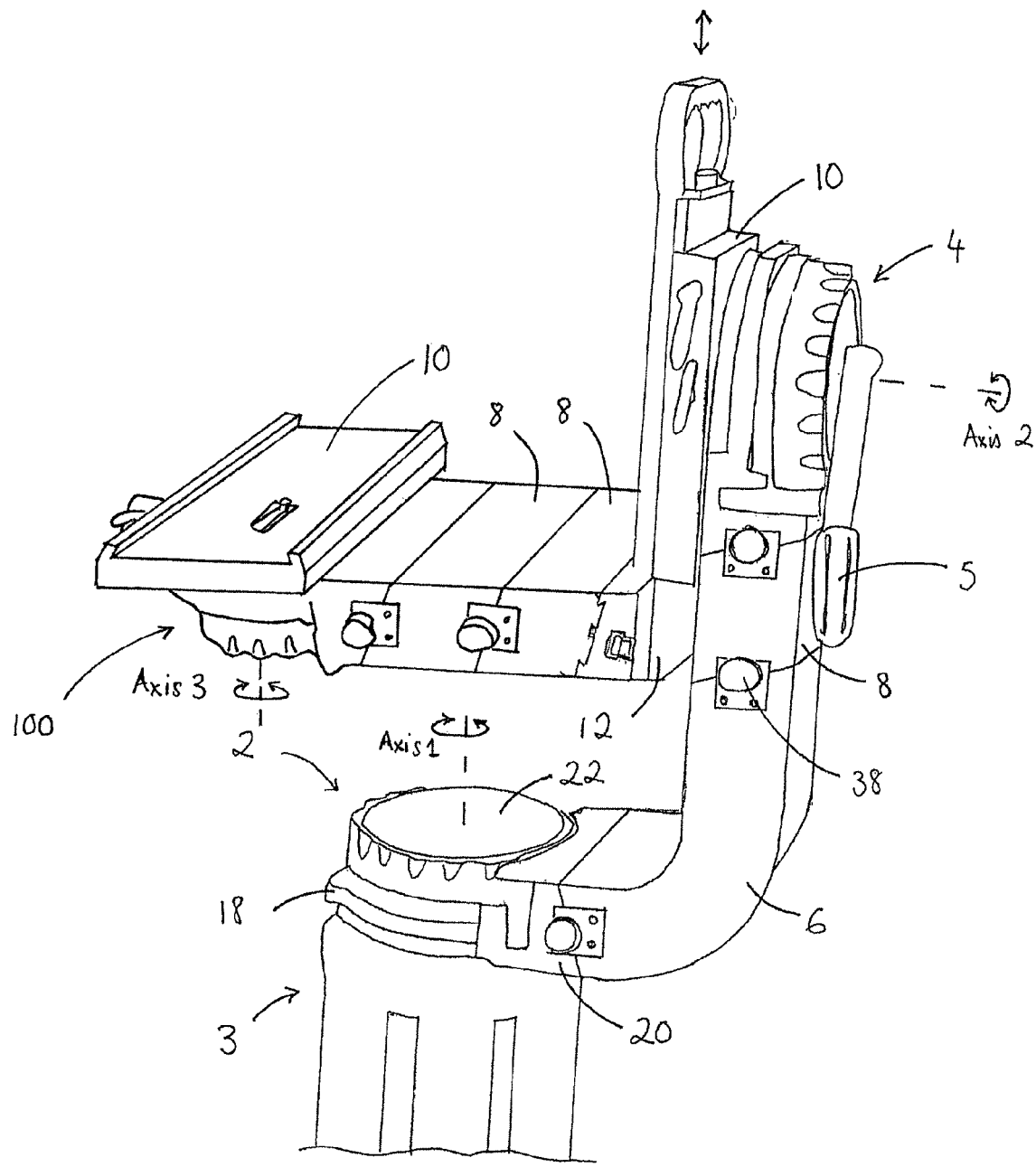
FIG. 7 shows a perspective view of a support in accordance with another embodiment of the present invention.

In a further arrangement, as shown in FIG. 7, it is possible to introduce a third axis of rotation by replacing the platform with a third fluid head 100. The third fluid head is identical to the first and second fluid heads and is connected to the mortice of the tilt adjusting plate using its tenon. The third fluid head is provided with a guide plate 10 identical to that provided on the second fluid head, as discussed above. The guide plate, which is connected to the third fluid head, receives the camera plate in the same manner as the platform, described above, which it replaces. The slidable connection between the camera plate and the guide plate allows the position of the camera plate to be adjusted in a direction perpendicular to the third axis.

In order to effect rotation about the third axis the third fluid head is provided with a handle, as described with respect to the second fluid head.

If it is desired to increase the distance between the second and third fluid heads in the second axial direction, it is possible to introduce one or more spacer blocks 8 between the third fluid head and the tilt adjusting plate. The distance between the second and third fluid heads in the first axial direction may be adjusted by sliding the tilt adjusting plate relative to the guide plate of the second fluid head.

The third axis lies perpendicular to the second axis. The orientation of the third axis relative to the second axis is fixed by virtue of the connection of the third fluid head through the mortice and tenon joint between the tilt adjusting plate and the third fluid head, or spacer block if used.

The orientation of the third axis relative to the first axis is varied with rotation about the second axis. Since the third fluid head is supported such that it may be rotated about the second axis, its orientation varies with respect to the first axis.

The arrangement of the support is such that the camera plate and the camera supported thereon may be rotated about all three axes simultaneously.

Rotation of the support about the first axis results in rotation of the second and third fluid heads about the first axis, and rotation of the support about the second axis results in rotation of the third fluid about the second axis.

By virtue of the modular nature of the support, numerous other configurations are possible, as will be readily appreciated by the person skilled in the art.

The support may of course be used to support other equipment than cameras, such as lighting or sound apparatus, building or surveying equipment or aids, or many other types of equipment.

The invention claimed is:

1. A support for a camera comprising a first fluid head and a second fluid head, the first fluid head being arranged to provide rotation about a first axis and the second fluid head being arranged to provide rotation about a second axis, which is perpendicular to the first axis,
wherein all of the fluid heads are provided with a connecting means arranged to allow detachable connection of each of the fluid heads from the support,
wherein the camera is supported by a platform provided with a connecting means identical to the connecting means of the fluid heads, and wherein the platform is detachably connected to the second fluid head, using the connecting means, via at least one intermediate component, which is provided with a compatible connecting means, and
wherein the intermediate component is slidably supported by the second fluid head, and a ratchet mechanism is provided to allow the position of the intermediate component relative to the second fluid head to be locked.

2. A support as claimed in claim 1 arranged such that a supported camera can be rotated about all of the axes simultaneously.

3. A support as claimed in claim 2, wherein the camera is supported such that its position can be adjusted linearly in a first direction, which is perpendicular to the second axis.

4. A support as claimed in claim 1, wherein the distance between the first and second fluid heads is adjustable in the first and second axial directions.

5. The support as claimed in claim 1, wherein all of the fluid heads are substantially identical to one another.

6. The support as claimed in claim 1, wherein the first and second fluid heads are detachably connected to one another, using the connecting means, via one or more intermediate components, provided with compatible connecting means.

7. The support as claimed in claim 6, wherein the first and second fluid heads are connected via a substantially J-shaped component, which is provided with compatible connecting means at each of its longitudinal ends.

8. The support as claimed in claim 7, wherein the connecting means are arranged such that either end of the substantially J-shaped component may be connected to either one of the first or second fluid heads.

9. The support as claimed in claim 7, wherein either one or both of the first and second fluid heads is connected to the substantially J-shaped component via one or more spacers, provided with compatible connecting means.

10. The support as claimed in claim 1, wherein the camera is slidably supported by the platform, and a ratchet mechanism is provided to allow the position of the camera relative to the platform to be locked.

11. The support as claimed in claim 1, wherein the connecting means provided on each of the fluid heads comprises one of a dovetail mortice or a dovetail tenon and the corresponding compatible connecting means comprise the other one of a dovetail mortice or a dovetail tenon, so as to provide a sliding dovetail mortice and tenon joint.

12. The support as claimed in claim 11, wherein the mortice and tenon each have a continuous profile, comprising tapered front and rear sections and a central section of continuous width, which extends between the front and rear sections, wherein the front section is tapered to expand from a minimum width at the front end of the mortice/tenon to the width of the central portion, and wherein the rear section is tapered to expand from the width of the central portion to a maximum width at the rear of the mortice/tenon.

13. A support for a camera comprising a first fluid head and a second fluid head, the first fluid head being arranged to provide rotation about a first axis and the second fluid head being arranged to provide rotation about a second axis, which is perpendicular to the first axis, and further comprising a third fluid head, the third fluid head being arranged to provide rotation about a third axis, which is perpendicular to the second axis, and which varies in orientation with respect to the first axis with rotation about the second axis,
wherein all of the fluid heads are provided with a connecting means arranged to allow detachable connection of each of the fluid heads from the support,
wherein the camera is supported by the third fluid head, and wherein the third fluid head is detachably connected to the second fluid head, using the connecting means, via at least one intermediate component, which is provided with a compatible connecting means, and wherein the intermediate component is slidably supported by the second fluid head, and a ratchet mechanism is provided to allow the position of the intermediate component relative to the second fluid head to be locked.

14. A support as claimed in claim 13, wherein the camera is supported such that its position can be adjusted linearly in a first direction, which is perpendicular to the second axis, and/or in a second direction, which is perpendicular to the third axis.

15. A support as claimed in claim 13, wherein the distance between the second and third fluid heads is adjustable in the second and third axial directions.

16. The support as claimed in claim 13, wherein the camera is slidably supported by the third fluid head, and a ratchet mechanism is provided to allow the position of the camera relative to the third fluid head to be locked.

\* \* \* \* \*